United States Patent
Hudelot et al.

(10) Patent No.: US 9,188,684 B2
(45) Date of Patent: Nov. 17, 2015

(54) COUNT RATE MEASUREMENT DEVICE AND ASSOCIATED FISSION CHAMBER CALIBRATION DEVICE

(75) Inventors: Jean-Pascal Hudelot, Greoux les Bains (FR); Jean-Michel Girard, Aix-en-Provence (FR); Philippe Bernard, Alleins (FR); Nicolas Saurel, Is-sur-Tille (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1065 days.

(21) Appl. No.: 12/809,574

(22) PCT Filed: Dec. 22, 2008

(86) PCT No.: PCT/EP2008/068173
§ 371 (c)(1),
(2), (4) Date: Jun. 18, 2010

(87) PCT Pub. No.: WO2009/083537
PCT Pub. Date: Jul. 9, 2009

(65) Prior Publication Data
US 2010/0266092 A1    Oct. 21, 2010

(30) Foreign Application Priority Data
Dec. 24, 2007  (FR) .................................... 07 60330

(51) Int. Cl.
*G01T 3/00* (2006.01)
*G01T 1/185* (2006.01)
*G21C 17/108* (2006.01)

(52) U.S. Cl.
CPC .. *G01T 3/00* (2013.01); *G01T 1/185* (2013.01)

(58) Field of Classification Search
CPC .......... G21C 17/108; G01T 3/00; G01T 1/185
USPC .......................................... 376/154, 254, 259
See application file for complete search history.

(56) References Cited

U.S. PATENT DOCUMENTS 3,177,363 A * 4/1965 Scherbatskoy ................. 250/386
4,497,768 A * 2/1985 Caldwell et al. ............... 376/153
(Continued)

FOREIGN PATENT DOCUMENTS

FR        2670301 A1      6/1992

OTHER PUBLICATIONS

Rinard, P., Neutron Interactions with Matter (1997), available at www.fas.org/sgp/othergov/doe/lanl/lib-www/la-pubs/00326407.pdf.*

(Continued)

*Primary Examiner* — Jack W Keith
*Assistant Examiner* — Daniel Wasil
(74) *Attorney, Agent, or Firm* — Nixon Peabody LLP; Khaled Shami (57) ABSTRACT

A fission chamber count rate measurement device and to the associated fission chamber calibration device; the count rate measurement device comprises: (1) a measurement cell, which contains the fission chamber (CH); (2) a neutron generator, which emits neutrons in the form of periodic pulses towards the fission chamber; (3) a neutron counter (K), which detects and counts the neutrons emitted by the neutron generator; and (4) a computing circuit, which delivers, over a predetermined time interval, a fission chamber count rate normalized with reference to the number of neutrons counted by the neutron counter (K).

10 Claims, 8 Drawing Sheets (56) References Cited

U.S. PATENT DOCUMENTS

| | | | | |
|---|---|---|---|---|
| 4,634,568 | A | * | 1/1987 | Wimpee et al. ............ 376/154 |
| 4,639,349 | A | * | 1/1987 | Baratta et al. ............. 376/254 |
| 5,192,490 | A | * | 3/1993 | Burel ........................ 376/154 |
| 5,249,207 | A | * | 9/1993 | Bacconnet ................. 376/254 |
| 6,362,485 | B1 | * | 3/2002 | Joyce et al. ............ 250/390.01 |
| 6,477,219 | B2 | * | 11/2002 | Hirukawa et al. .......... 376/255 |
| 6,596,998 | B1 | * | 7/2003 | Siedel ..................... 250/370.1 |
| 2002/0118789 | A1 | * | 8/2002 | McCartney ................ 376/428 |

OTHER PUBLICATIONS

French Search Report in French Application No. FR 0760330, dated Nov. 11, 2008.
Database Inspection [Online], XP002503313, Database Accession No. 3786041, dated Nov. 13, 2008; (Abstract of: Jarvis, O. N. et al., "In-Vessel Calibration of the Jet Neutron Monitors Using a 252Cf Neutron Source: Difficulties Experienced," Review of Scientific Instruments, vol. 61, Iss. 10, Oct. 1990, American Institute of Physics, pp. 3172-3174.).
Jarvis, O. N. et al., "In-Vessel Calibration of the Jet Neutron Monitors Using a 252Cf Neutron Source: Difficulties Experienced," Review of Scientific Instruments, vol. 61, Iss. 10, Oct. 1990, American Institute of Physics, pp. 3172-3174.
Stammers et al., "The Calibration of the MAST Neutron Yield Monitors," Nuclear Instruments & Methods in Physics Research, Section A: Accelerators, Spectrometers, Detectors and Associated Equipment, vol. 562, Jun. 2006, pp. 521-530.
International Search Report and Written Opinion in International Application No. PCT/EP2008/068173, mailed on Mar. 31, 2009.

* cited by examiner

COUNT RATE MEASUREMENT DEVICE AND ASSOCIATED FISSION CHAMBER CALIBRATION DEVICE

CROSS REFERENCE TO RELATED APPLICATIONS OR PRIORITY CLAIM

This application is a national phase of International Application No. PCT/EP2008/068173, entitled "COUNT RATE MEASUREMENT METHOD AND DEVICE", which was filed on Dec. 22, 2008, and which claims priority of French Patent Application No. 07 60330, filed Dec. 24, 2007.

DESCRIPTION

Technical Field And Prior Art

The present invention relates to a fission chamber count rate measurement device as well as a fission chamber calibration device that comprises the count rate device of the invention. The present invention also relates to a fission chamber count rate measurement method.

Fission chambers are used to detect neutrons. A fission chamber contains the fissile material and a gas capable of ionising. Due to the effect of neutrons, the fissile material emits particles that ionise the gas. The quantity of gas ionised expresses the quantity of neutrons received in the fission chamber. Only a part of the fissile material, known as the effective mass, participates in the emission of the particles that ionise the gas. In practice, precise knowledge of the effective mass is necessary for the determination of the absolute physical magnitudes, which are the neutron flux or the indices of spectra. The calibration device of the invention makes it possible to measure the effective mass of the fissile isotope.

At the moment, the calibration of fission chambers is carried out in nuclear reactors, either in thermal spectrum (or thermal column), or in fission spectrum. Numerous calibration methods have been developed in this context. Said methods all require the use and the availability of a research reactor. For reasons of safety, said methods require the implementation of experimental procedures that are laborious to implement and are, consequently, costly. Moreover, research reactors equipped with calibration devices are less and less numerous throughout the world, which explains the necessity of having to travel if it is wished to calibrate fission chambers.

The calibration devices of the prior art have numerous drawbacks. The calibration device of the invention does not have these drawbacks.

Description of the Invention

Indeed, the invention relates to a count rate measurement device of at least one fission chamber that contains the fissile material, characterised in that it comprises:
a measurement cell that contains the fission chamber,
a neutron generator that emits neutrons in the form of periodic pulses towards the fission chamber,
a measurement cable that collects, via a connector, a signal delivered by the fission chamber following the interaction of the neutrons with the fissile material,
a neutron counter that delivers a neutron count signal emitted by the neutron generator,
a processing system that delivers, over a predetermined time interval contained within a period of emission of the neutrons emitted by the neutron generator, a signal representative of the signal delivered by the fission chamber and a signal representative of the neutron count signal, and
a circuit for computing the count rate of the fission chamber normalized with reference to the neutron count signal, from the signal representative of the signal delivered by the fission chamber and the signal representative of the neutron count signal.

According to an additional characteristic of the invention:
the measurement cell comprises a structure in which is formed a cylindrical cavity that opens via an opening into a wall of the structure,
a first cylindrical jacket is placed on a wall of the cylindrical cavity, the first cylindrical jacket containing the fission chamber, the connector and a first part of the measurement cable,
a second cylindrical jacket surrounds at a distance the first cylindrical jacket, the first and the second cylindrical jackets having, each, a first end fixed, in the structure, by a first ring situated on the side where the cavity opens into the wall of the structure and a second end fixed, in the structure, by a second ring,
a third cylindrical jacket situated at the exterior of the structure is substantially aligned with the first cylindrical jacket, the third cylindrical jacket containing a second part of the measurement cable that extends the first part and a centering ring that maintains the cable in the second jacket.

According to another additional characteristic of the invention, the device comprises:
a sheet of material that covers the cylindrical jacket, and
a hollow cylindrical structure placed between the sheet of material and the second cylindrical jacket.

According to yet another additional characteristic of the invention, the sheet of material is a sheet of cadmium.

According to yet another additional characteristic of the invention, the material that constitutes the hollow cylindrical structure placed on the sheet of material is made of boron and polyethylene According to yet another additional characteristic of the invention, the first cylindrical jacket and the second cylindrical jacket are separated by an air filled space.

According to yet another additional characteristic of the invention, the structure in which the cavity is formed is made of graphite.

According to yet another additional characteristic of the invention, the neutron generator is integrated in the structure of the measurement cell.

The invention also relates to a calibration device intended to measure an effective mass of fissile material contained in at least one fission chamber, characterised in that it comprises a count rate measurement device according to the invention and a circuit for computing the effective mass of the fissile material from the count rate delivered by the count rate computing circuit.

The invention also relates to a method of measuring the count rate of at least one fission chamber that contains the fissile material, characterised in that it comprises:
an emission of neutrons in the form of periodic pulses towards the fission chamber so that the fission chamber delivers a signal that results from the interaction of the neutrons with the fissile material,
a counting of the neutrons emitted to form a counting signal,
a processing of the signal delivered by the fission chamber and the counting signal over a predetermined time interval contained within a period of emission of the neutrons emitted to deliver a signal representative of the signal delivered by the fission chamber and a signal representative of the counting signal, and a computation of the count rate of the fission chamber normalized with reference to the counting signal from the signal representative of the signal delivered by the fission chamber and the signal representative of the counting signal.

The count rate measurement device of the invention comprises a neutron generator operating in pulsed mode.

The device of the invention advantageously makes it possible:
- to obtain the calibration values with a precision equivalent to that obtained in reactor, and
- to obtain calibrations in various neutron spectra.

Advantageously, the materials and dimensions of the different components that constitute the measurement cell in which is placed the fission chamber may be determined by a design method compatible, at the choice of the designer, with a fast spectrum or with a thermal spectrum of the interrogating neutrons of the fission chamber.

A fast neutron spectrum is defined in that 99.9% of the neutrons have an energy above 1 MeV. A thermal neutron spectrum is defined in that 99.9% of the neutrons have an energy below 0.625 eV.

For each type of neutron spectrum, the devices are adapted, for example, to fission chambers of 1.5 mm, 4 mm or 8 mm diameter.

BRIEF DESCRIPTION OF DRAWINGS

Other characteristics and advantages of the invention will become clear on reading the description of a preferential embodiment made with reference to the appended figures, among which.

DETAILED DESCRIPTION OF IMPLEMENTATION EMBODIMENTS OF THE INVENTION

Figure 1:
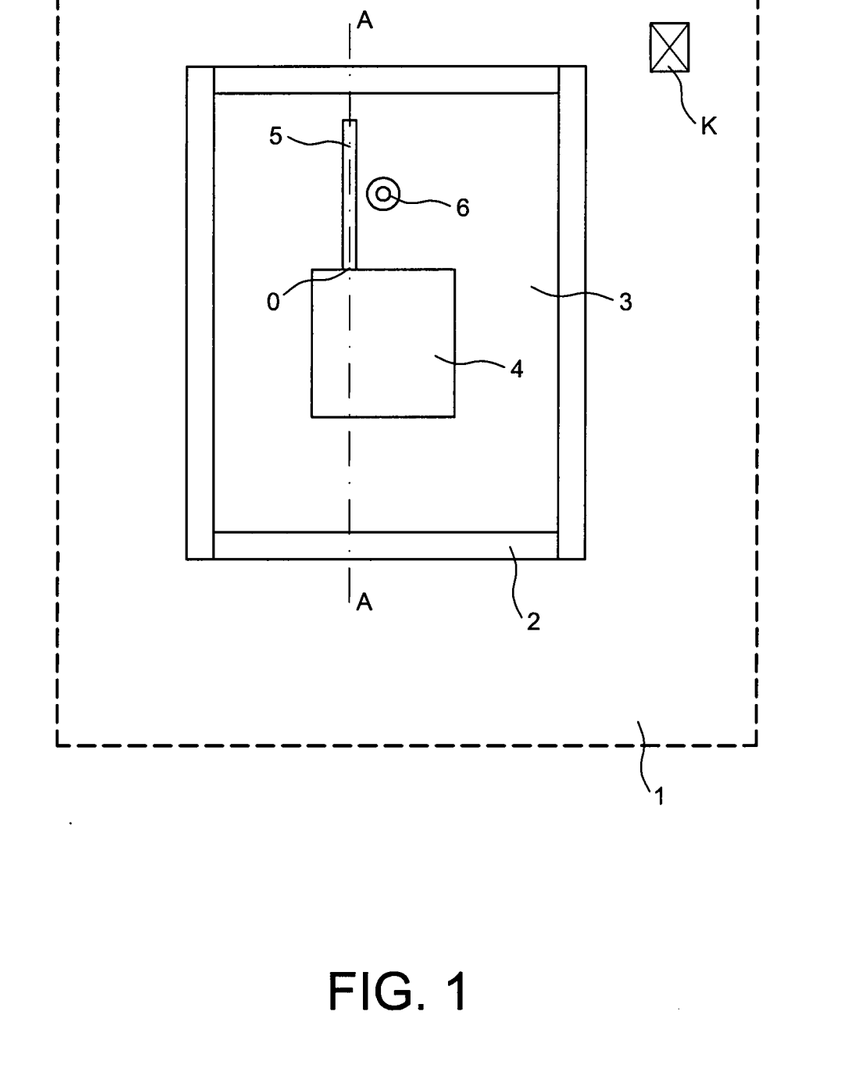
FIG. 1 represents a schematic diagram of measurement cell that is part of the count rate measurement device of the invention.

FIG. 1 represents a measurement cell that contributes to the count rate measurement device of the invention. The measurement cell 1 is constituted of an enclosure 2 that contains a material 3 in which is formed a cavity 4 and a neutron counter K. The material that constitutes the enclosure 2 is, for example, made of polyethylene and the material 3 is, for example, made of graphite. A longitudinal cavity 5 capable of accommodating a fission chamber is formed inside the material 3. A neutron generator 6 is placed, in the material 3, near to the cavity 5. The cylindrical cavity 5 opens into the cavity 4 by an opening O. In the embodiment represented in FIG. 1, the neutron counter K is placed next to the enclosure 2. The invention also relates to the case where the neutron counter is situated in the enclosure 2.

Figure 2:
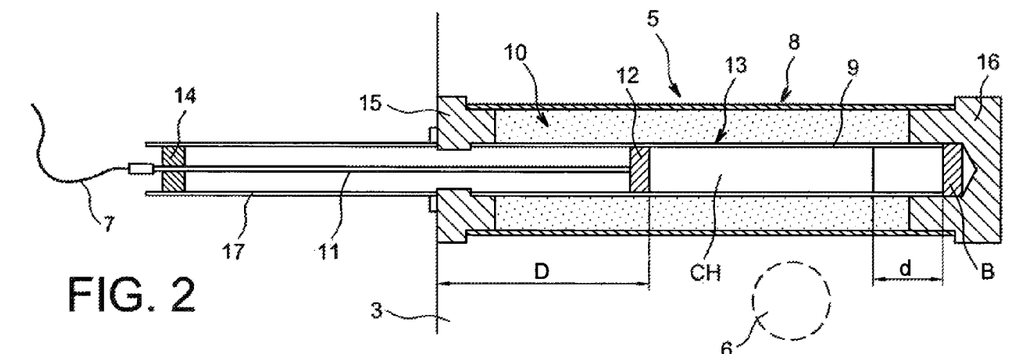
FIG. 2 represents a partial sectional view of a first example of structure that is part of the count rate measurement device of the invention.

FIG. 2 represents a partial sectional view of a first example of structure that contributes to the count rate measurement device of the invention.

The structure represented in FIG. 2 is intended to obtain a fast neutron spectrum. The cavity 5 contains two cylindrical coaxial jackets 8, 9, the jacket 8 surrounding the jacket 9. The jackets 8 and 9 are, for example, made of stainless steel and have a thickness of 1 mm. A sheet of material 13, for example a sheet of cadmium of 1mm thickness, covers the exterior face of the cylinder 9. The purpose of the sheet of material 13 is to capture the thermal neutrons, in other words the neutrons whose energy is below 0.625 eV. A block of material 10 is placed in the space that separates the sheet of material 13 and the jacket 8. The material 10, for example made of boron and poylethylene, has a thickness equal, for example, to 16 mm. Two centering rings 15 and 16 maintain and align the cylindrical jackets 8 and 9 in the cavity 5. A stop B closes the cavity on the side of the centering ring 16. The fission chamber CH is placed in the cylindrical jacket 9. A first end of the fission chamber is connected to a connection component 12 that collects the electrons created due to the ionisation of the gas contained in the chamber. This first end of the fission chamber is placed at a distance D from the opening O, the other end of the chamber being placed at a distance d from the stop B. The connection component 12 is connected to a rigid coaxial cable 11. A cylindrical jacket 17, for example a jacket made of stainless steel of 1 mm thickness, aligned with the cylindrical jacket 9, is placed in the cavity 4. A centering ring 14 maintains the rigid coaxial cable 11 in the cylindrical jacket 17. A connector connects the rigid coaxial cable 11 to a flexible measurement cable 7 that transmits the signal to processing circuits (not represented in FIG. 2; see FIG. 3).

The guiding and positioning system constituted by the components 14, 15 and 16 advantageously guarantees a good reproducibility of the axial position of the chamber CH. The precision obtained for this position may be, for example, of the order of 1 mm, or even less.

The materials and dimensions of the structure of the invention represented in FIG. 2 are preferentially obtained by means of the Monte-Carlo MCNP (MCNP for "Monte-Carlo N-Particle") neutron computation code. It is precisely by this computation code that the above mentioned materials and dimensions have been obtained. However, other materials having equivalent characteristics could also be chosen for the constitution of this structure. The choice of these other materials would then imply a different dimensioning to obtain substantially equivalent performances. The above mentioned materials make it possible however to produce a calibration device having "acceptable" dimensions, in other words a device neither too voluminous nor too bulky. The choice of stainless steel for the cylindrical jackets 8, 9 and 17 makes it possible to ensure an excellent rigidity to the whole of the device and to guarantee its resistance to wear. The choice of boron and poylethylene is justified by the good resistance of this material to ageing, by its efficiency in terms of capture of thermal neutrons and by its low cost.

The centering device 14, 15, 16 of the fission chamber is specific for each diameter of chamber studied. The centering rings 14, 15, 16 and the stop B are, for example, made of stainless steel. The diameters of the centering rings and the machining of the stop B are adapted to the diameter of the rigid coaxial cable 11. The centering device makes it possible not only to control the axial position and the radial centering of the chamber in the device but, also, allows the fission chamber to slide longitudinally in order to optimise the measurement position (and search for the position corresponding to the maximal count rate). In fact, it is the assembly constituted by the fission chamber CH, the connector 12 and the coaxial rigid 11 that slides in the jacket 9. The centering of this assembly is ensured by the ring 14.

In the structure described above, only the neutrons not having undergone slowing down/thermalization in the graphite of the cell and in the boron and poylethylene penetrate inside the fission chamber. Thus, the fission chamber only sees the fast neutrons emitted by the generator 6, in other words the neutrons that have not undergone interaction.

Figure 3:
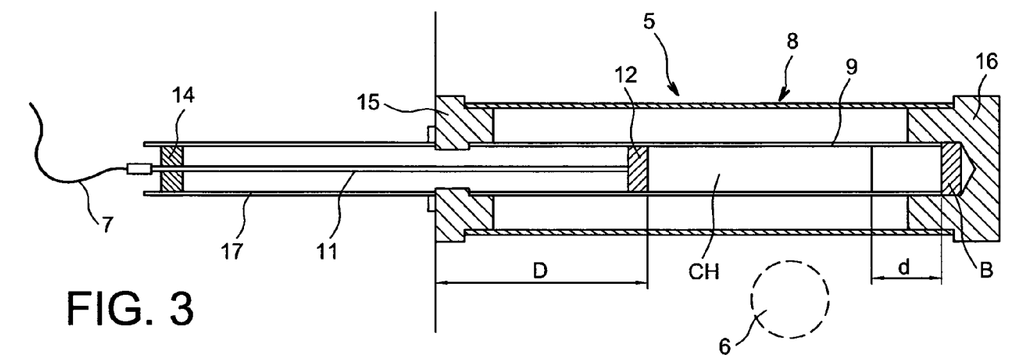
FIG. 3 represents a partial sectional view of a second example of structure that is part of the count rate measurement device of the invention.

FIG. 3 represents a partial sectional view of a second example of structure that contributes to the count rate measurement device of the invention. The structure of FIG. 3 is adapted to obtaining a thermal neutron spectrum. The cavity 5 comprises all the constituent elements already described with reference to FIG. 2, with the exception of the block of material 10 and the sheet of cadmium 13. The space between the jackets 8 and 9 is here filled with air. In the same way as previously, the position of the fission chamber may be adjusted longitudinally by means of, for example, sliding means mentioned previously.

The neutrons that have come from the generator 6 can here penetrate into the fission chamber whatever their energies. However, these neutrons pass through beforehand a thickness of graphite between, for example, 0 cm and around 40 cm according to the position occupied by the fission chamber in the jacket 9, which makes it possible to discriminate their energy as a function of their instant of arrival at the level of the fission chamber, in other words as a function of the thickness of graphite traversed. By way of non limiting example, the computations worked out from the Monte-Carlo MCNP4C2 code have shown that more than 99.9% of the neutrons emitted by a neutron generator, the firing frequency of which is 125 Hz are, after each firing, thermal neutrons in a time range between 700 µs and 3500 µs, whatever the axial position of the chamber in the calibration device.

Figure 4:
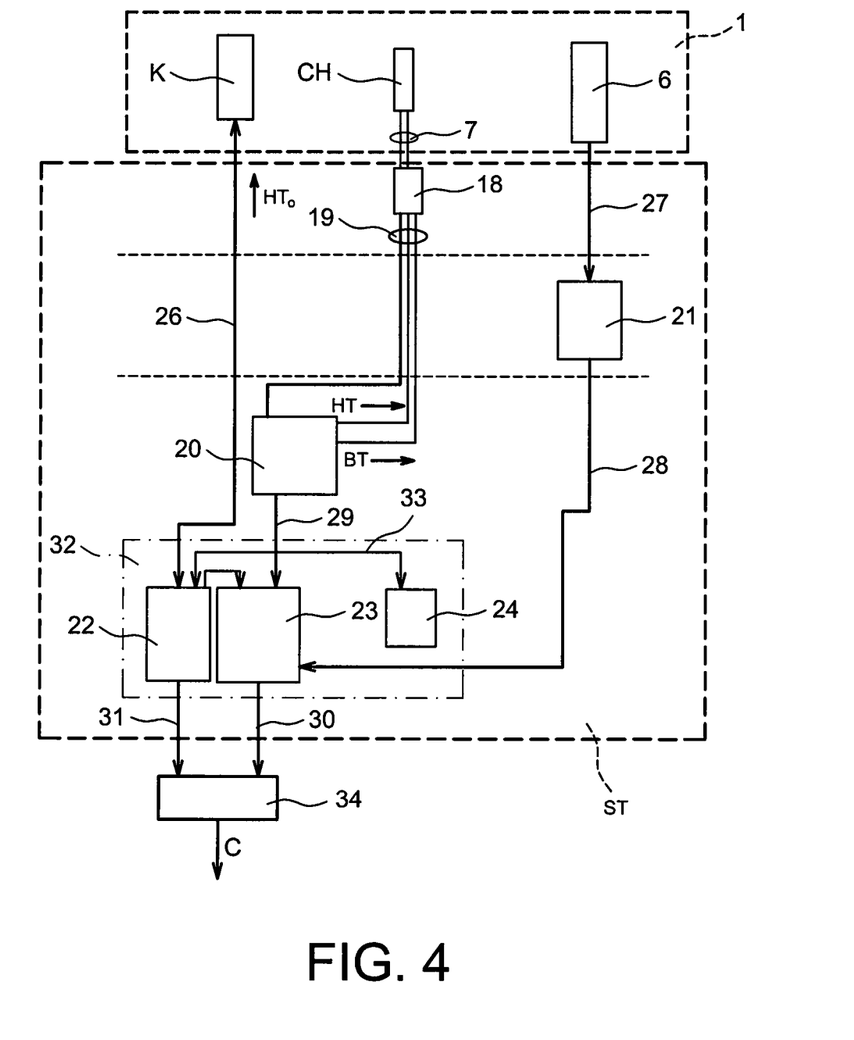
FIG. 4 represents a schematic diagram of fission chamber count rate device of the invention.

FIG. 4 illustrates a schematic diagram of the fission chamber count rate measurement device of the invention. The measurement device comprises:
- a measurement cell 1 as described above and in which are integrated a fission chamber CH, neutron generator 6 and a neutron counter K,
- a processing system ST of the signals delivered by the fission chamber CH and by the counter K and that delivers, on the one hand, a signal representative of the signal delivered by the fission chamber and, on the other hand, a signal representative of the signal delivered by the counter K, and
- a computing circuit 34 that calculates the count rate C of the fission chamber normalized in relation to the signal delivered by the counter K from the signals delivered by the processing system ST.

The processing system ST comprises:
- a preamplifier 18 that amplifies the signal delivered, via the measurement cable 7, by the fission chamber CH,
- an amplifier 20 connected to the preamplifier 18 by a multi-conductor cable 19 that transmits towards the fission chamber a high voltage HT and a low voltage BT,
- an electronic circuit 21 connected by a cable 27 to the neutron generator 6,
- an acquisition circuit 32, which comprises an amplifier 22, an acquisition card 23 and a high voltage circuit 24, the amplifier 22 receiving, via a cable 26, the signal delivered by the counter K and, via an electrical connection 33, the high voltage delivered by the circuit 24, the cable 26 supplying in high voltage $HT_0$ the counter K, the acquisition card 23 receiving, via an electrical connection 29, the signal delivered by the amplifier 20 and, via an electrical connection 28, the signal delivered by the electronic circuit 21, the amplifier 22 delivering the signal representative of the signal delivered by the counter K and the acquisition card 23 delivering the signal representative of the signal delivered by the fission chamber.

By way of non limiting example, FIG. 4 represents a device containing a single fission chamber. However, the invention more generally relates to the case where the device contains N fission chambers, N being an integral number greater than or equal to 1.

Figure 5:
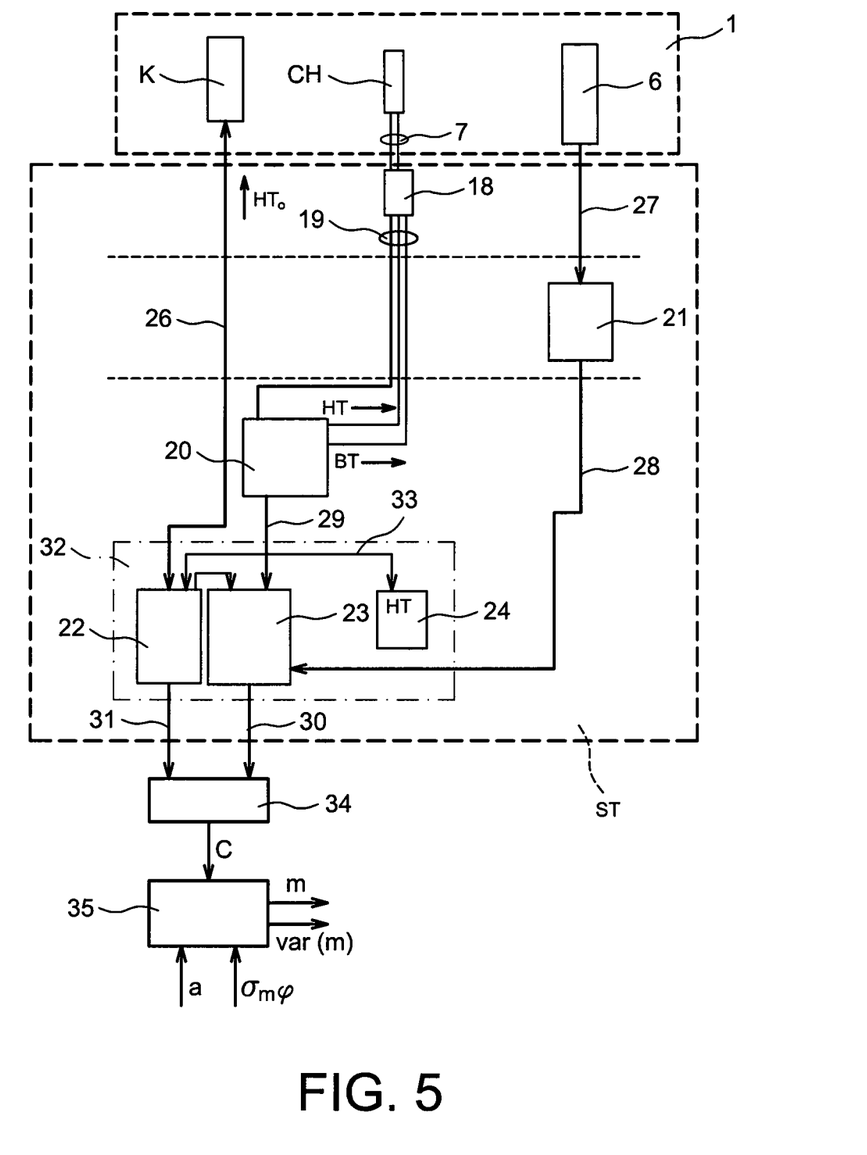
FIG. 5 represents a schematic diagram of calibration device of the invention.

FIG. 5 represents a schematic diagram of fission chamber calibration device of the invention. In addition to the components mentioned with reference to FIG. 4, the calibration device represented in FIG. 5 comprises a computing circuit 35, which calculates the effective mass of the fissile material contained in the fission chamber from the normalized count rate C delivered by the computing circuit 34. An example of computation method implemented by the circuit 34 is given in the remainder of the description. Other computation methods could however be envisaged. The computation method will be described in a general case where N fissile masses contained in N different fission chambers are calculated simultaneously. Each fission chamber contains a principal isotope and impurities.

The matrix column [m] formed from the effective masses of fissile material contained in the N fission chambers is written:

$$[m]=[C]\cdot I([a]\times[\sigma_m \phi]) \quad (1),\text{ where}$$

- [C] is the matrix of the normalized count rates (or number of hits per second) of N fission chambers,
- [a] is the matrix of the isotopic analyses of N deposits of fissile material, normalized in relation to the principal isotopes,
- $[\sigma_m \phi]$ is the matrix column of the integral mass cross sections of macroscopic fission normalized in relation to counter K ("mass cross section" is herein taken to mean a cross section relative to a mass unit and not to a nucleus), and where
- the symbol "·I" represents the matrix division operator and the symbol "×" represents the matrix multiplication operator.

The matrix [C] is constructed from measurements delivered by the circuit 34. The coefficients of the matrix [a] are determined for each fissile material of each fission chamber, in a manner known per se, by isotopic analysis. For a fission chamber of given exterior dimensions (diameter, length), the matrix $[\sigma_m\phi]$ is invariant for a given position of the fission chamber in the measurement cell and for a given calibration configuration of the calibration device (fast or thermal neutrons and time range linked to the nature of the spectrum). It is then possible to determine the matrix $[\sigma_m\phi]$ by means of a particular matrix $[\sigma_m\phi]_0$ that corresponds, for the above mentioned invariance conditions, to deposits of fissile material of known effective mass. It then follows:

$$[\sigma_m\phi]_0 = [a]_0^{-1} \times [m]_0^{-1} \times [c]_0 \quad (2)$$

where the coefficients of the matrices $[a]_0^{-1}$ and $[m]_0^{-1}$ are known and the coefficients of the matrix $[C]_0$ are the count rate measured for the deposits of fissile material of known effective mass.

The matrix [m] is then written:

$$[m] = [C] \cdot I([a] \times [\sigma_m\phi]_0) \quad (3)$$

In addition to the matrix [m], the computing circuit 35 also calculates the matrix of the variances var(m), where var(m) represents the variance of the effective mass m. The equation of the matrix of the variances is explained below. The above mentioned equation (2) may be written in a generic manner in the following way:

$$[x_{ij}] = [A_{ij}] \times [B_{ij}] \times [C_{ij}],$$

where i is the index relative to the rank of the lines of the matrix and j the index relative to the rank of the columns of the matrix.

By making the hypothesis of the independence of terms $A_{ij}$, $B_{ij}$ and $C_{ij}$, in other words assuming the independence of uncertainties on [C], $[\sigma_m\phi]$ and [a], the derivation of the uncertainty leads to:

$$[var(X_{ij})] = [var(A_{ij})] \times [(B_{ij})^2] \times [(C_{ij})^2] + [(A_{ij})^2] \times [var(B_{ij})] \times [(C_{ij})^2] + [(A_{ij})^2] \times [(B_{ij})^2] \times [var(C_{ij})]$$

The variances of the matrices $[\sigma_m\phi]_0$ and [m] are then written, respectively, as follows:

$$var[\sigma_m\phi]_0 = [[[m]_0 \times [a]_0]_{ij}^2]_0^{-1} \times \{var[c]_0 + ([m_{ij}^2]_0 \times var[a]_0 + var[m]_0 \times [a_{ij}^2]_0) \times [\sigma_m\phi_{ij}^2]_0\}$$

and $$var[m] = \{var[C] + [m_{ij}^2] \times (var[a] \times [\sigma_m\phi_{ij}^2]_0 + [a_{ij}^2] \times var[\sigma_m\phi]_0)\} \cdot I\{[([a] \times [\sigma_m\phi])_{ij}^2]\}$$

In the above formulas, the notation $[Z_{ij}^2]$ represents the matrix constituted of the terms zij to the power 2, $z_{ij}$ being the coefficient of the line of rank i and of the column of rank j of the matrix [Z].

Generally speaking, a fission chamber of principal isotope i contains impurities. In practice, U-234 and U-236 impurities are often present in negligible quantity in uranium U-233, U-235 or U-238 chambers and thus do not pose any problem. In the case Pu-238 chambers for example, the impurity U-234 is a product of the radioactive decay of Pu-238 with a period of 87.7 years. If a sufficiently recent Pu-238 chamber is employed, the quantity of U-234 will thus be negligible.

In the cases where it is not possible to disregard the impurities, the computation method advantageously takes into account their influence. The calculated coefficients of the matrix [m] are then effective equivalent masses that take into account, apart from the effective masses of the principal isotopes, the effective masses of the impurities present in the fission chamber. By way of non limiting example, the expression of an effective equivalent mass of principal isotope Pu-238 that contains U-234 impurities will now be given.

The equivalent number $N_{eq}$ of nuclei of Pu-238 isotope contained in a fission chamber is calculated with the following equation:

$$N_{eq} = \left(N_4 \times \frac{\sigma_{4,c}}{\sigma_{8,c}} + N_8\right)$$

where:
$N_4$ is the number of nuclei of U-234 contained in the chamber and known by analysis,
$N_8$ is the number of nuclei of Pu-238 contained in the chamber and known by analysis,
$\sigma_{4,c}$ is the microscopic fission cross section of the impurity U-234, computed, for example, with the MCNP4C2 code, in the measurement conditions (counting time interval and fast neutron spectrum or thermal studied),
$\sigma_{8,c}$ = microscopic fission cross section of Pu-238, computed, for example, with the MCNP4C2 code, in the measurement conditions (counting time interval and fast or thermal nature of the neutron spectrum studied).

The effective equivalent mass $m_{eq}$ of Pu-238 that is taken into account as coefficient of the matrix [m] is then given by the following formula:

$$m_{eq} = m_4 \times \frac{238}{234} \times \frac{\sigma_{m4c}}{\sigma_{m8c}} + m_8$$

where
$m_4$ is the effective mass of U-234 in the chamber,
238 is the mass number of Pu-238,
234 is the mass number of U-234,
$\sigma_{m4c}$ is the microscopic mass fission cross section of U-234, computed, for example, with the MCNP4C2 code, in the measurement conditions (counting time interval and fast or thermal nature of the neutron spectrum studied),
$\sigma_{m8c}$ is the microscopic mass fission cross section of Pu-238, computed, for example, with the MCNP4C2 code, in the measurement conditions (counting time interval and fast or thermal nature of the neutron spectrum studied),
$m_8$ is the effective mass of Pu-238 in the chamber.

The measurement of a fission chamber count rate by means of a device such as that represented in FIG. 4 will now be described.

The determination of the count rate comprises the following principal steps:
establishment of measurement conditions specific to the fast or thermal nature of the neutron spectrum;
implementation of a measurement methodology.

The establishment of the measurement conditions comprises:
a determination of the optimal longitudinal position of the fission chamber, in relation to a count rate of the chamber, the optimal position retained corresponding to a maximum count rate, and thus to a minimum counting time for a given statistical counting uncertainty,
a regulation of the acquisition time range and the number of acquisition passes adapted to the performances and specificities of the neutron generator,
a regulation of the time of acquisitions relative to a statistical uncertainty objective of 1% on the count rate.

The measurement methodology implemented comprises the following steps:
- a regulation in PHA mode (PHA for "Pulse Height Analysis") of a discrimination threshold of the background noise contained in the acquisition signal of the fission chamber,
- an association of the discrimination threshold with the sought after calibration magnitude (effective mass),
- a transposition of regulation in PHA mode to acquisition in MCS mode (MCS for "Multi-Channel Scaler") of the dynamic signal of the fission chambers during the operation of the neutron generator, and
- a monitoring of the measures obtained so as to dispense with operating fluctuations of the neutron generator from one measurement to the next.

The different points mentioned above will now be made clear.

Determination of the Optimal Position of the Chamber

Preferably, it is advisable firstly to determine the optimal position of the fission chamber in the measurement cell so as to reduce as best as possible the acquisition time needed to obtain a statistical uncertainty of 1% on the count rates obtained. This step is not obligatory but it is recommended to save time and reduce as much as possible the wear of the neutron generator.

Figure 6:
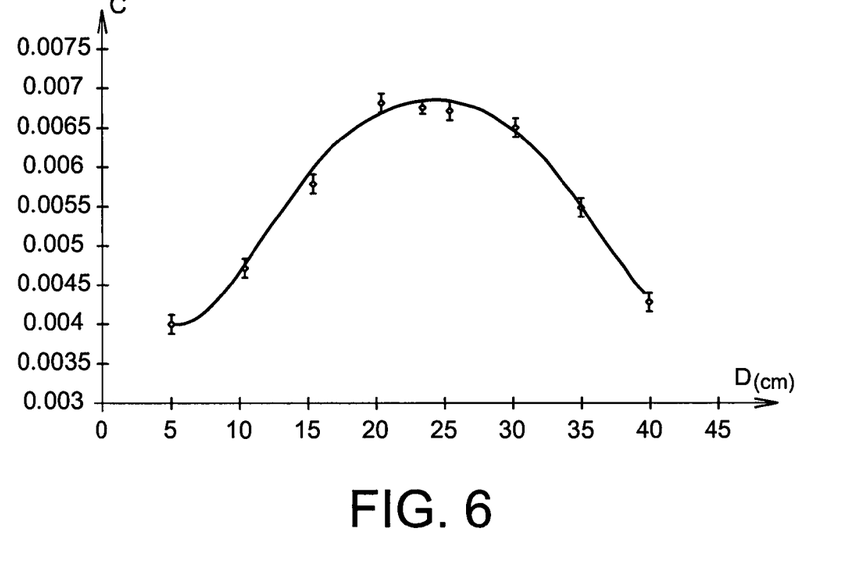
FIG. 6 represents, in the case of a fast neutron spectrum, an example of count rate curve obtained by a count rate measurement device of the invention, as a function of the position occupied by the fission chamber in the measurement device.

FIG. 6 represents, in the case of a fast neutron spectrum, an example of curve of the normalized fission rate C measured as a function of the position that a fission chamber occupies in the measurement cell (distance D of the chamber in relation to the opening O). In the example chosen, the fission chamber contains around 100 µg of uranium-235 and the distance D that separates the chamber from the opening O varies from 5cm to 40cm. By way of indication, the acquisition time of each measurement is 800s, which makes it possible to obtain countings ranging between 2000 hits and 3500 hits over a region of interest between 30 µs as and 230 µs. Indeed, due to the cutting off of the thermal neutrons in the boron and poylethylene, no neutron reaches the fission chamber outside of this time range. The position retained is that corresponding to the maximum count rate. In the example of FIG. 6, the optimal position obtained is situated 23 cm from the opening O of the cavity 5. This position is then retained for all of the calibration measurements in fast neutron configuration.

Figure 7:
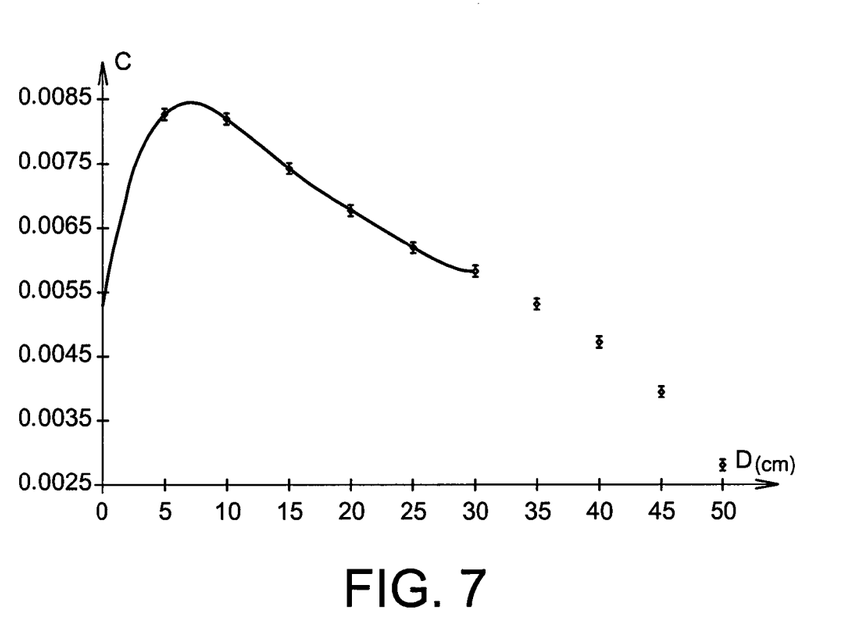
FIG. 7 represents, in the case of a thermal neutron spectrum, an example of count rate curve obtained by a count rate measurement device of the invention, as a function of the position occupied by the fission chamber in the acquisition system.

FIG. 7 represents an example of curve of the normalised fission rate C measured as a function of the position that the fission chamber occupies in the measurement cell in the case of a thermal neutron spectrum. In the example chosen, the fission chamber contains around 100 µg of uranium-235 and the position of the distance D varies from 0 to 40 cm. By way of indication, the acquisition time of each of the measurements is 560 s. This time makes it possible to obtain countings ranging between 10000 hits and 30000 his over a region of interest ranging between 700 µs and 3500 µs. This time range corresponds to the instants during which the population of thermal neutrons of energy below 0.625 eV is greater than 99.9%. The maximum count rate is here observed at the position of 5 cm. This position is then retained for all of the calibration measurements in thermal configuration.

In all of the devices, the precision associated with the positioning of the fissile deposit of the fission chamber is of the order of 3 mm, including the uncertainty on the positioning of the fission chamber in the device and the uncertainty on the positioning of the deposit in the fission chamber. These imprecisions lead to an uncertainty of the order of 0.1% on the count rate of the fission chamber, which is virtually negligible.

Acquisition Range-Number of Passes-Acquisition Time

The operating and acquisition parameters of a measurement are the following:
- the firing frequency of the neutron generator, for example a frequency of 125 Hz, which corresponds to a time between two pulses of the neutron generator equal to 8000 µs;
- the number of passes, in other words the number of firings of the neutron generator, which it is necessary to adapt to the minimal counting integral sought, for example 10000 hits, over a given time range, namely, for the above mentioned frequency of 125 Hz, the range 30 µs-230 µs in fast neutron devices and the range 700 µs-3500 µs in thermal neutron devices,
- the acquisition time, which is equal to the number of passes multiplied by the time between two pulses of the neutron generator (the acquisition time varies as a function of the nature and the deposits contained in the fission chamber and is typically equal to ten minutes for a thermal neutron device and to one hour for a fast neutron device when the fission chamber contains of the order of 100 µg of actinide).

The measurement methodology will now be described.

Figure 8:
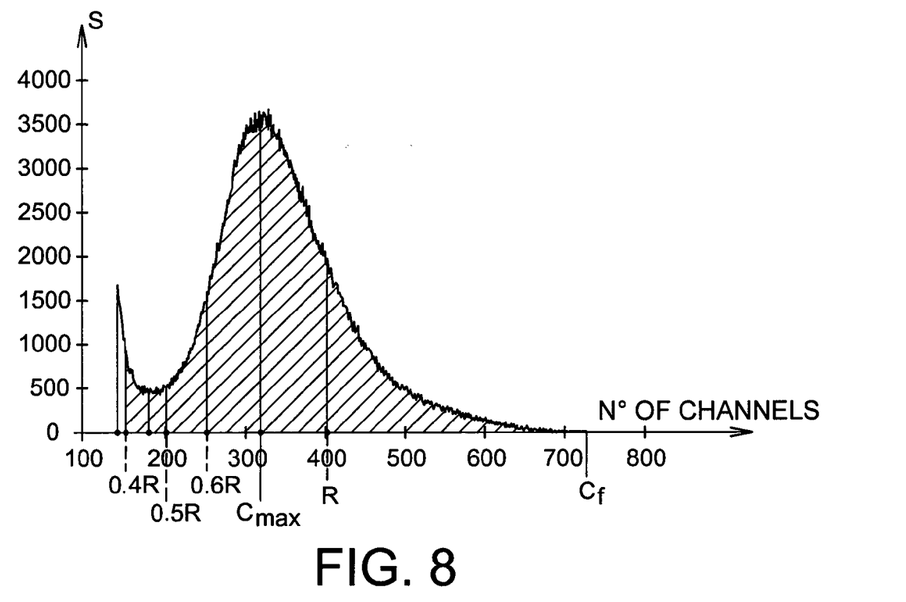
FIG. 8 represents an example of spectrum obtained, without noise correction, by a count rate measurement device of the invention.
Figure 9:
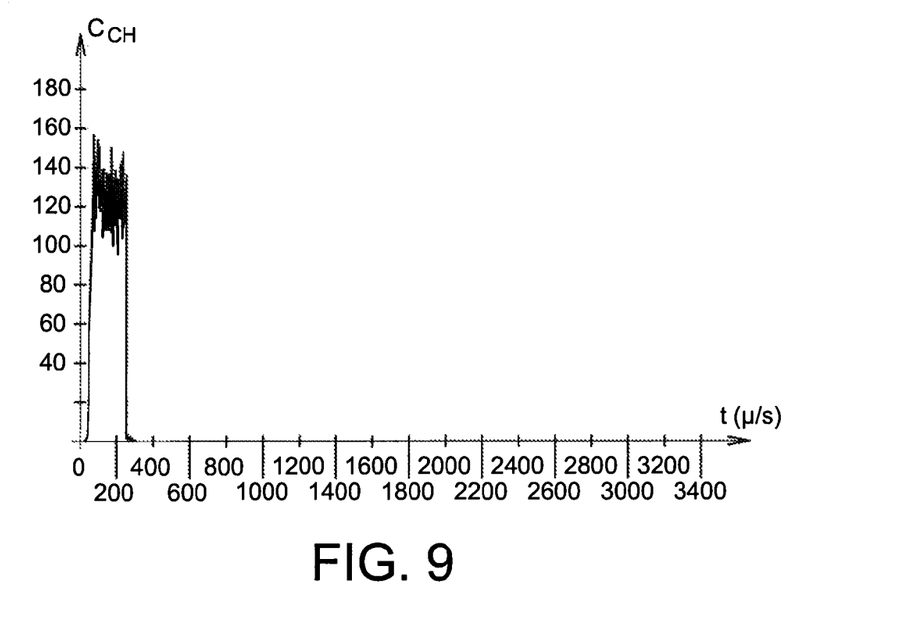
FIG. 9 represents, in fast neutron configuration, an example of count rate curve obtained, as a function of time, by means of a count rate measurement device of the invention.

Regulation in PHA Mode of the Discrimination Threshold of the Background Noise—Association of this Discrimination Threshold with the Sought after Calibration Magnitude According to an improvement of the invention, it is provided not to take into account, in the signal delivered by the fission chamber, the electronic background noise or the noise due to particles or radiation other than neutrons. As illustration, FIG. 8 represents an example of spectrum S of fission chamber in which noise lines appear. Said noise lines are present in the first channels of the signal.

The strategy adopted to eliminate these noises is to set a discrimination threshold making it possible to exclude the background noise contained in the first channels of the signal and, consequently, to only integrate the useful part of the signal corresponding to the neutron reactions.

The method employed consists in carrying out an acquisition of the signal of the fission chamber in PHA mode (linking the number of hits to the amplitude of the signal), then to link the discrimination threshold to the shape of the signal that is specific to the fission chamber, since this shape is relative to the energy deposited by the fission products in the chamber. A counting integral is associated with the discrimination threshold. A value of the calibration magnitude (i.e. a value of effective mass of the fissile deposit in the fission chamber) is then associated with this counting integral. By way of indication, the method comprises the following steps:
- a pinpointing of the channel Cmax corresponding to the maximum counting of the spectrum,
- a computation of the average of the countings over, for example, ten channels situated on either side of the channel Cmax, i.e. $V_{av}$ this average value,
- a pinpointing, on the spectrum, of the channel corresponding to the value $V_{av}/2$,
- a linear regression around the zone situated between five points that precede and five points that follow $V_{av}/2$,
- a determination of the straight line equation obtained due to the linear regression,
- by means of the straight line equation thereby obtained, a determination of the channel R corresponding to $V_{av}/2$, and the adoption of a precision, for example, to two decimal places (it appears that the channel R is uniquely a function of the spectrum delivered and does not vary as a function of the nature of the neutron spectrum),
- a computation of the value of the channels corresponding to a fraction of the channel R (for example 0.4 R, 0.5 R and 0.6 R) while always keeping the same number of decimal places for the precision, an identification of the discrimination threshold as being the fraction of channel R corresponding as best as possible to the "valley" channel Cv (for example 0.5 R (cf. FIG. 8)), a computation of the counting integral between the discrimination threshold and the end of counting channel Cf (see FIG. 8). The channel Cf is characterised in that all of the channels greater than Cf correspond to a zero count rate.

There is obviously interest to favour a maximum of useful signal, in other words to retain an integration threshold as close as possible to the "valley" channel Cv (see FIG. 8).

The method of determination of the discrimination threshold is not unique, since other methods may be used. However, this method makes it possible a priori to dispense with any change to the measurement conditions (gain of the amplifier, shaping constant of the signal, energy of the incident neutrons, etc.). Through experience, it adds on average an uncertainty of 0.5% on the measured count rates.

Transposition of the Regulation in PHA Mode to the Acquisition in MCS Mode of the Dynamic Signal As seen previously, obtaining calibration magnitudes necessitates only considering the signal from the fission chambers over a certain time range lying between two firings of the neutron generator, in order to meet the objectives in terms of purity of the neutron spectrum.

The acquisition of the signals from the fission chambers in MCS mode (counting scale ranking the number of events as a function of time) is thus necessary, so as to be able to follow the signal over time.

It is thus advisable to regulate the lower threshold of the discriminator so that it corresponds perfectly with the chosen integration threshold (see previous paragraph).

To do this, it suffices to multiply the integration threshold defined beforehand in PHA mode for each chamber by the magnitude G such that:

$$G = \text{Range in volts of the discriminator/Number of acquisition channels}$$

to obtain in volts the regulation value of the lower threshold of the discriminator. By way of non-limiting example, and in a manner known per se, the number of channels for the analysis of the measurements is equal to 1024 and the range in Volts of the discriminator is equal to 10.

Since the determination of the lower discrimination threshold is exact, it may then be considered that the associated uncertainty is zero.

Monitoring of Measurements

So as to dispense with operating fluctuations of the neutron generator from one measurement to another (flux of emerging neutrons or wear of the generator), it is necessary to monitor the neutron emission of the neutron generator, so as to normalize all of the measurements made in reference to an identical operation of the neutron generator. It is for this purpose that the calibration device comprises a neutron counter K. The counter K may be positioned in the interior or the exterior of the measurement cell. By way of non limiting example, the counter K is represented outside of the measurement cell in FIG. 1. The monitoring may be carried out by means of any type of neutron detector. By way of non limiting example, the counter K is a helium counter 3 positioned near to, for example several tens of centimetres, the measurement cell.

Throughout the count rate measurement procedure and, consequently, the calibration procedure, it is preferable not to displace the counter K in relation to the fission chamber and to the neutron generator.

The principle of the monitoring is to record systematically and in a synchronised manner the counting of the counter K and the counting of the fission chamber. All of the measurements delivered by the fission chamber are then normalized with reference to the average counting of the counter K (circuit 34).

It may then be considered, by making the hypothesis that the signal delivered by the counter K is stable over time, that the only uncertainties to take into account are the statistical uncertainties of counting of the chamber.

Validation of the Calibration Device of the Invention

A validation of the count rate measurement device of the invention will now be described on the basis of measurement results illustrated by FIGS. 9-12. An example of count rate $C_{CH}$ as a function of time delivered by a fast neutron device uranium-235 fission chamber is given in FIG. 9. It may be noted that the signal follows overall the emission pulse of the neutron generator in the time interval 30 µs-230 µs. The signal is indeed cancelled beyond 230 µs, which validates the quality of the fast device as regards stopping the neutrons thermalized in the surrounding graphite.

Figure 10:
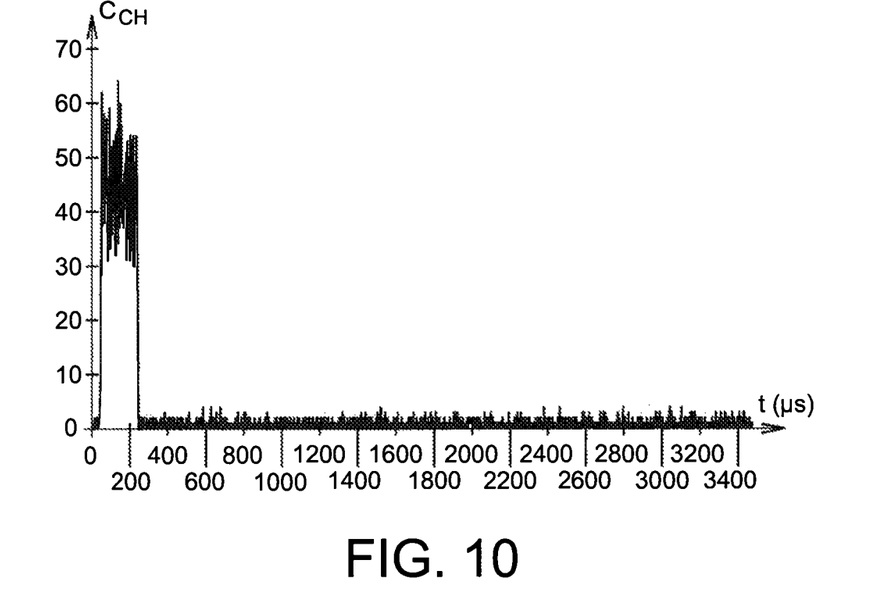
FIG. 10 represents, in thermal neutron configuration, a first example of count rate curve obtained, as a function of time, by means of a count rate device of the invention.
Figure 11:
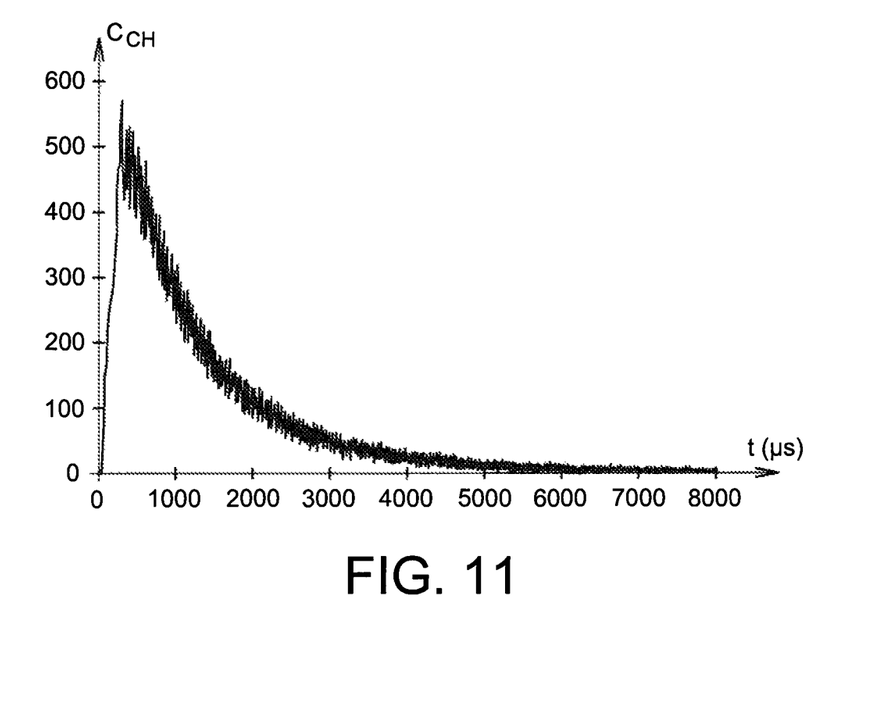
FIG. 11 represents, in thermal neutron configuration, a second example of count rate curve obtained, as a function of time, by means of a count rate measurement device of the invention.

For thermal neutron devices, two examples of count rate $C_{CH}$ measurements obtained with neptunium-237 and uranium-235 fission chambers are given respectively in FIGS. 10 and 11.

It may be noted, for the neptunium-237 fission chamber, that the signal follows initially the emission pulse of the neutron generator, lying in the time interval 30 µs-230 µs, then cancels out, which signifies that beyond the emission of the pulse of the neutron generator, no fast neutron is any longer observed in the thermal devices (in particular over the time range 700 µs-3500 µs retained in the study), due to the fact that neptunium-237 has a zero fission cross section in the thermal domain. It may further be noted that the signal from the uranium-235 fission chamber (fissile isotope to the thermal neutrons) initially follows the emission pulse of the neutron generator, lying in the time interval 30 nµs-230 µs, then continues to evolve without cancelling itself out as the thermal neutrons arrive at the level of the detector after having passed through the graphite of the measurement cell.

The above elements validate the conception of the calibration cell by means of Monte Carlo MCNP4C2 code computations, as has been mentioned above, and for which it has been agreed to analyse all of the measurements over the time interval 700 µs-500 µs, corresponding to the interrogation of the fission chamber by thermal neutrons of energy below 0.625 eV in more than 99.9% of cases.

Figure 12:
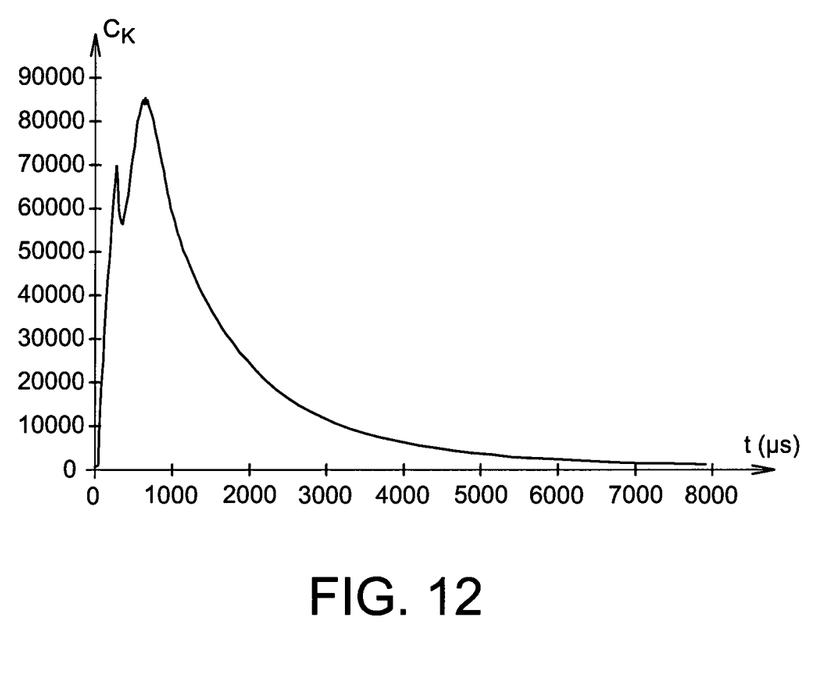
FIG. 12 represents an example of count rate obtained, in thermal neutron configuration or in fast neutron configuration, at the level of a neutron counter that is part of the count rate measurement device of the invention.

By way of illustration, FIG. 12 represents the count rate $C_K$ detected by a helium 3 counter used as monitor for all of the measurements. The counter, positioned at the rear of the cell, firstly sees arrive the fast neutrons emitting during the pulse of the generator then, in a delayed manner, the neutrons more or less thermalized in the graphite and the polyethylene of the measurement cell.

By way of indication, counting integrals greater than or equal to 10000 hits (relative to a statistical uncertainty of 1%) have been obtained over around one hour in fast neutron device and over around ten minutes in thermal neutron device, from a fission chamber containing of the order of 100 µg of fissile material and a neutron generator operating in pulse mode at a frequency of 125 Hz and with a neutron emission of $3.10^9 \text{n.s}^{-1}$. These elements also validate the conception of the devices.

The invention claimed is:

1. Count rate measurement device of at least one fission chamber that contains fissile material, said count rate measurement device comprising:
   a measurement cell that contains the fission chamber,
   a neutron generator operable to emit neutrons, at a predetermined periodic pulse frequency, towards the fission chamber;
   a measurement cable, which collects, via a connector, a signal delivered by the fission chamber following the interaction of the neutrons with the fissile material;
   a neutron counter that delivers a neutron count signal corresponding to the neutrons emitted by the neutron generator at the predetermined periodic pulse frequency;
   a processing system that processes both the signal delivered by the fission chamber and a corresponding neutron count signal delivered by the neutron counter, and provides, during a predetermined time interval contained within a period defined by two successive pulses of neutrons emitted by the neutron generator, respectively, a signal representative of the signal delivered by the fission chamber and a signal representative of the neutron count signal, and
   a circuit for computing the count rate of the fission chamber normalized with reference to the neutron count signal, from the signal representative of the signal delivered by the fission chamber and the signal representative of the neutron count signal.

2. Count rate measurement device according to claim 1, wherein the measurement cell further comprises:
   a structure in which is formed a cylindrical cavity that opens via an opening into a wall of the structure,
   a first cylindrical jacket disposed on a wall of the cylindrical cavity,
   a second cylindrical jacket disposed inside the cylindrical cavity, at a distance from the first cylindrical jacket, the second cylindrical jacket containing the fission chamber, the connector and a first part of the measurement cable, the first and the second cylindrical jackets each having a first end fixed, in the structure, by a first ring situated on a side where the cavity opens into the wall of the structure and a second end fixed, in the structure, by a second ring,
   a third cylindrical jacket situated at an end of the structure and aligned with the second cylindrical jacket, the third cylindrical jacket containing a second part of the measurement cable that extends the first part and a centering ring, with a central opening in which a part of the second part of the measurement cable is placed, thereby maintaining the second part of the measurement cable in the third cylindrical jacket.

3. Count rate measurement device according to claim 2 further comprising:
   a sheet of material that covers the second cylindrical jacket, and
   a block of material that is placed in a space separating the sheet of material and the first cylindrical jacket.

4. Device according to claim 3, wherein the sheet of material is a sheet of cadmium.

5. Device according to claim 3, wherein the material of the block of material is made of boron and polyethylene.

6. Device according to claim 2, wherein the first cylindrical jacket and the second cylindrical jacket are separated by an air filled space.

7. Device according to claim 2, wherein the structure in which the cavity is formed is made of graphite.

8. Device according to claim 2, wherein the neutron generator is integrated in the structure of the measurement cell.

9. Device according to claim 2, wherein the neutron counter is integrated in the structure of the measurement cell.

10. Calibration device operable to measure an effective mass of fissile material contained in at least one fission chamber, characterised in that it comprises a count rate measurement device according to claim 1 and a circuit for computing the effective mass of the fissile material from the count rate delivered by the circuit for computing the count rate.

* * * * *